United States Patent [19]

Kimura

[11] 4,240,641
[45] Dec. 23, 1980

[54] RECORD PLAYER

[75] Inventor: Shuichi Kimura, Yokohama, Japan

[73] Assignee: Sony Corporation, Tokyo, Japan

[21] Appl. No.: 36,991

[22] Filed: May 8, 1979

[30] Foreign Application Priority Data

May 8, 1978 [JP] Japan .................................. 53-54308
Oct. 27, 1978 [JP] Japan ................................ 53-132394

[51] Int. Cl.³ .............................................. G11B 3/10
[52] U.S. Cl. ................................................ 274/23 R
[58] Field of Search ................... 274/15 R, 13 R, 9 R, 274/23 R, 23 A

[56] References Cited

U.S. PATENT DOCUMENTS

| 3,000,005 | 9/1961 | Moyer ................................. 274/23 R |
| 3,093,379 | 6/1963 | Fabel et al. ........................ 274/23 R |
| 4,105,961 | 8/1978 | Plummer ....................... 274/23 R X |
| 4,138,121 | 2/1979 | Makajima et al. ................. 274/23 R |

Primary Examiner—Harry N. Haroian
Attorney, Agent, or Firm—Lewis H. Eslinger; Alvin Sinderbrand

[57] ABSTRACT

Apparatus for adjusting and displaying the stylus pressure exerted on a record disc by a stylus carried by a tone arm in a record playing device comprises a vertical drive motor for bi-directionally driving the tone arm in the vertical direction, an adjusting circuit, such as an adjustable resistor, producing a control signal whose level is determinative of the stylus pressure, an energizing circuit responsive to the control signal for energizing the vertical drive motor in accordance with the level of the control signal, thereby establishing the stylus pressure, and a display device, such as a digital display, responding to the control signal for providing a visual display of the stylus pressure as determined by the level of the control signal.

9 Claims, 6 Drawing Figures

FIG. 3
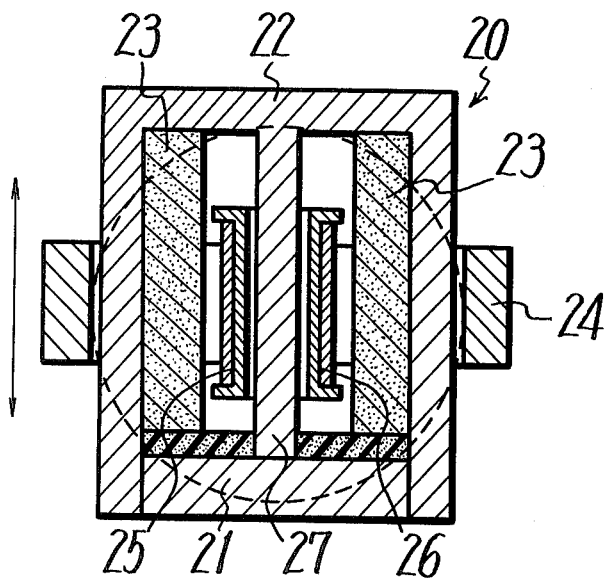
FIG. 4
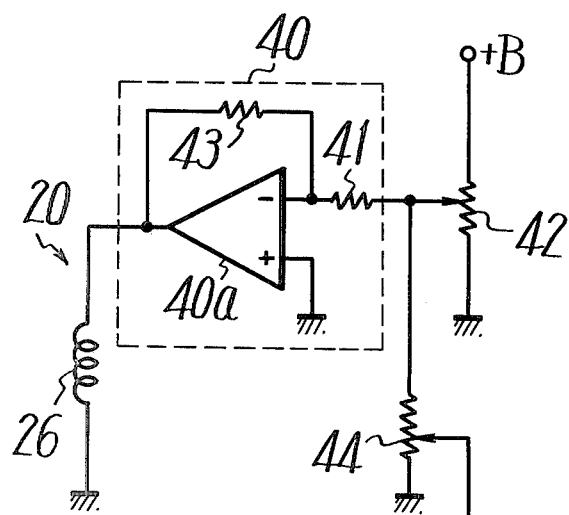
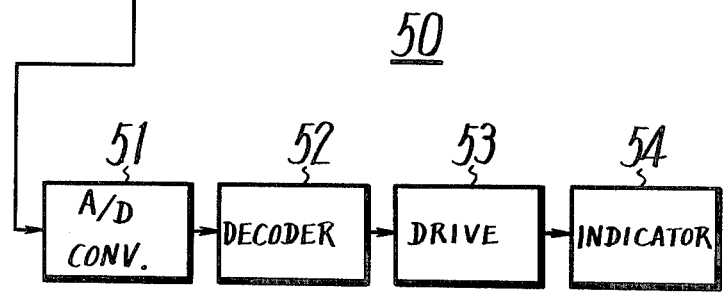

RECORD PLAYER

BACKGROUND OF THE INVENTION

1. Field of the Invention

This invention relates to record playing apparatus, and, more particularly, to apparatus for adjusting and displaying the stylus pressure exerted on a record disc by a stylus carried by a tone arm in a record playing device while the information which is recorded on the record disc is being reproduced.

2. Description of the Prior Art

In most record players, such as phonograph record players wherein sound information is reproduced by a stylus which tracks pre-recorded sound grooves, a stylus pressure-adjustment mechanism is provided to enable the user to adjust the pressure which is exerted on the record disc by the stylus. While stylus pressure must be sufficient to keep the stylus in the groove which is tracked, it must not be so great as to limit free movement and reduce the longevity of the stylus. Generally, stylus pressure is set and adjusted by a weight coupled to the rear end of the tone arm, that is, the end which is remote from the stylus, and the stylus pressure setting is indicated by direct mechanical measurement, that is, by a scale proximate the weight. As the precise position of the weight along the tone arm is adjusted, the stylus pressure is changed. A significant disadvantage in record playing devices of this kind, however, is that actual stylus pressure can not be readily ascertained or adjusted while a reproducing operation is in process, that is, while the stylus is in contact with the record disc. Rather, the reproducing operation must be interrupted and then, while the record playing device is in its quiescent condition, the actual stylus pressure can be changed. It has been proposed to move the tone arm of a recording playing device in the vertical direction by a vertical drive motor. In such a record playing device, selective energization of the vertical drive motor results in lowering the tone arm onto the surface of the record disc in order to initiate a reproducing operation, and lifting the tone arm at the completion of such a reproducing operation. That is, a current flowing through the vertical drive motor acts to control the vertical movement of the tone arm.

OBJECTS AND SUMMARY OF THE INVENTION

Accordingly, it is an object of this invention to provide improved apparatus for electronically adjusting and displaying the stylus pressure exerted on a record disc by a stylus carried by a tone arm in a record playing device.

More particularly, it is an object of this invention to provide selective energization of a vertical drive motor normally used to drive the tone arm in a vertical direction, in order to adjust the stylus pressure.

It is another object of this invention to provide apparatus for displaying the energizing current level of the aforementioned vertical drive motor so as to provide a direct display of stylus pressure.

It is still another object of this invention to provide apparatus for use in a record player in which the stylus pressure exerted on the record disc can be easily adjusted and displayed, even while the record player is in the process of carrying out a reproducing operation.

It is yet another object of this invention to provide an electronic display of the stylus pressure which is exerted and a record disc and preferably in a digital manner.

It is a further object of this invention to provide apparatus for displaying the stylus pressure in a record playing device and for exerting a stylus pressure on a record disc which correctly corresponds to the displayed stylus pressure.

In accordance with this invention, apparatus for adjusting and displaying the stylus pressure exerted on a record disc by a stylus carried by a tone arm in a record playing device comprises a vertical drive motor which bi-directionally drives the tone arm in the vertical direction, an adjustable element, such as a variable resistor, producing a control signal whose level is established by the setting of the adjustable element, and which is determinative of the stylus pressure, an energizing circuit responsive to the control signal for energizing the vertical drive motor in accordance with the level of the control signal, thereby establishing the stylus pressure, and a display device, such as a digital numerical display, responding to the control signal for providing a visual display of the stylus pressure as determined by the level of the control signal. In accordance with one aspect of this invention, the control signal, which is an analog signal derived from the adjustable element, is converted to a digital representation, and this digital representation is displayed. In one embodiment, the digital representation is re-converted back to an analog signal, and this re-converted analog signal is supplied to the energizing circuit and used therein for energizing the vertical drive motor. This avoids quantizing errors between the displayed stylus pressure and the actual stylus pressure.

The above, and other objects, features and advantages of this invention will be apparent in the following detailed description of illustrative embodiments which are to be read in connection with the accompanying drawings.

BRIEF DESCRIPTION OF THE DRAWINGS

FIG. 3 is a cross-sectional view taken along line III—III of FIG. 2;

FIG. 4 is a partial block, partial schematic diagram of one embodiment of the present invention;

DETAILED DESCRIPTION OF THE PREFERRED EMBODIMENTS

Figure 1:
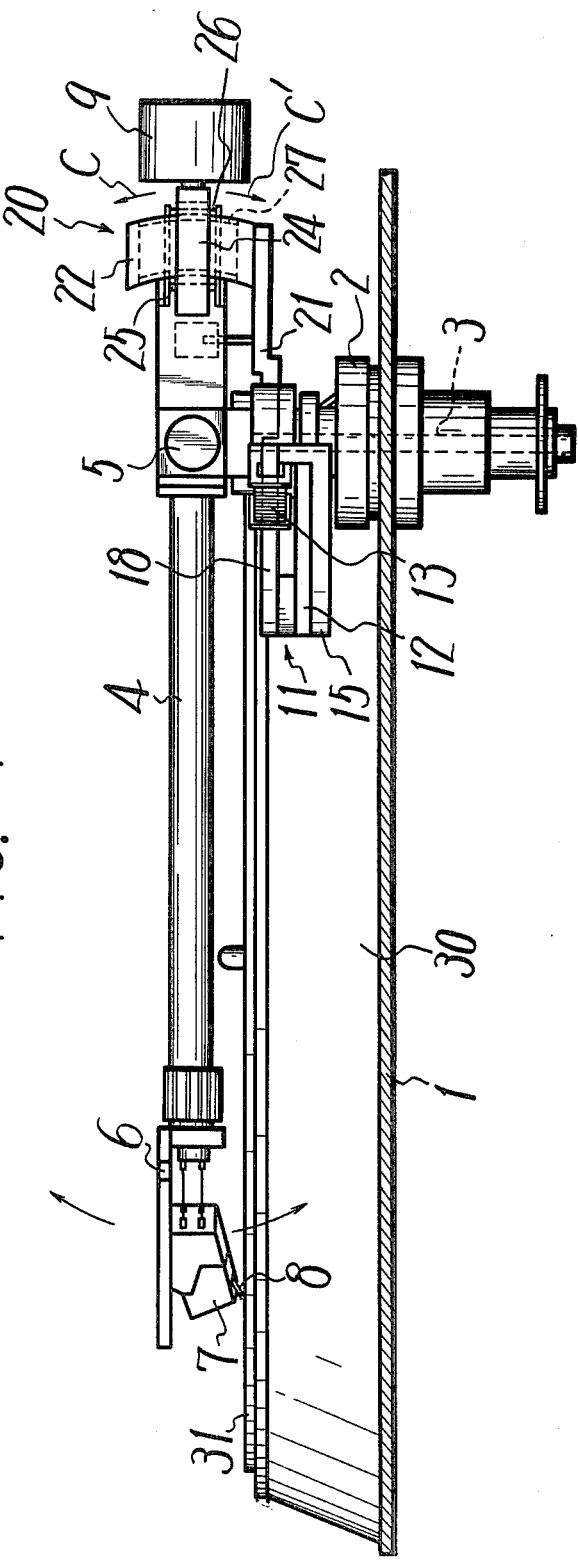
FIG. 1 is a side view of a record playing device in which the present invention finds ready application.
Figure 2:
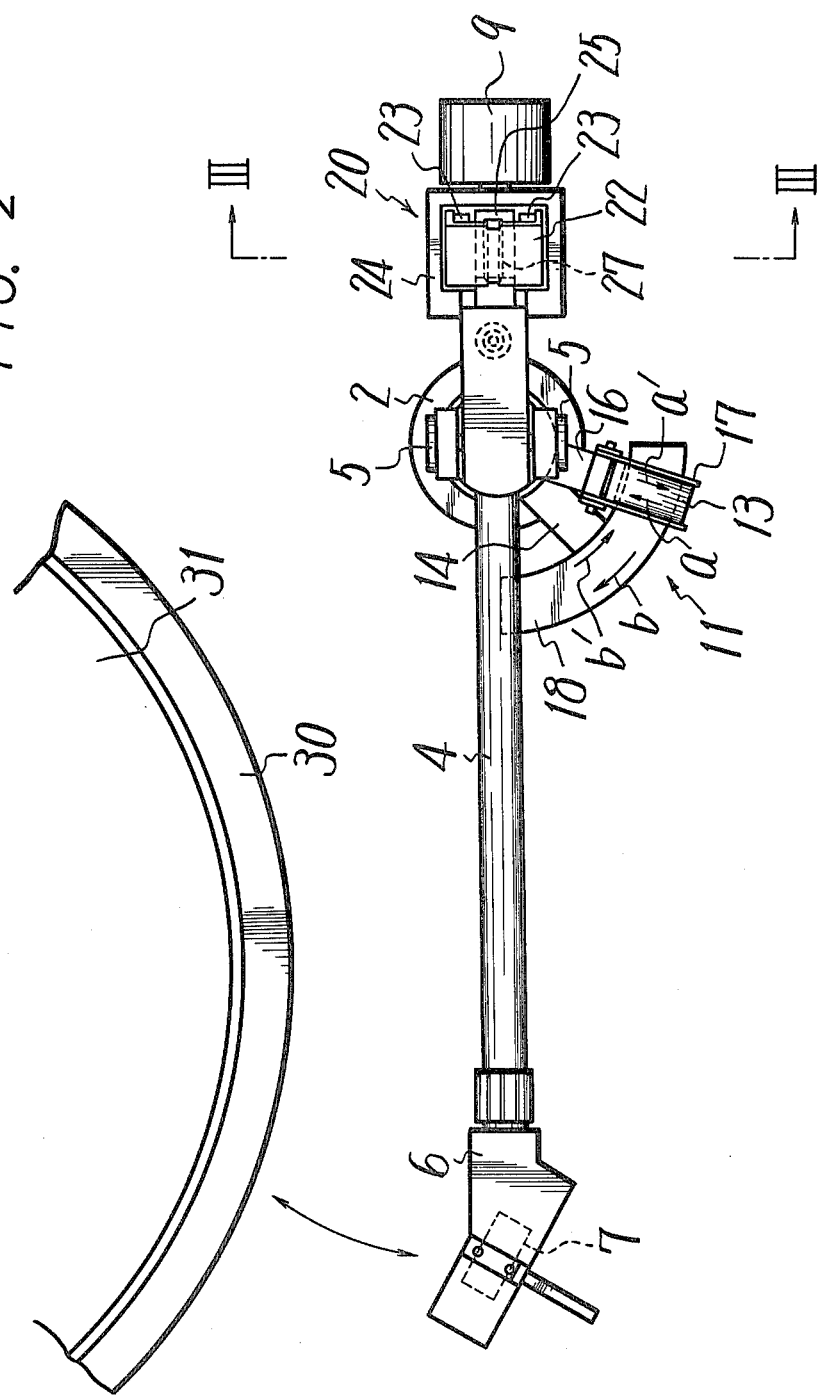
FIG. 2 is top view of a portion of the apparatus shown in FIG. 1.

Referring now to the drawings, and initially to FIGS. 1 and 2, there is illustrated a type of record playing device in which the present invention finds ready application. This device includes a rotatable shaft 3 supported by a bearing block 2 which is, in turn, supported on a support member 1, such as a support panel or frame upon which a turntable 30 also is supported. A tone arm 4 is mechanically coupled to the upper end of rotatable shaft 3 by means of a pivot axis or shaft 5 whereby tone arm 4 is adapted to move in the vertical and horizontal directions. That is, in the horizontal direction, tone arm 4 rotates with shaft 3 about the vertical axis of the latter and tone arm 4 further is adapted to pivot in the vertical direction about pivot axis 5. For the present discussion, the "horizontal direction" means a direction parallel to the surface of record disc 31 with which the illustrated record playing device is used, and the expression "vertical direction" is perpendicular to this horizontal direction. At one end of tone arm 4, referred to herein as the forward end, a cartridge support element, or head shell 6 is provided and a cartridge having a stylus 8 extending downwardly therefrom, is mounted to this head shell. It is appreciated that, when tone arm 4 pivots about pivot axis 5 in the vertical direction, head shell 6, together with cartridge 7 and stylus 8, moves in the vertical direction either to be placed upon record disc 31 or to be lifted therefrom, as represented by the illustrated arrows. A counter weight 9 is mounted to the rearward or tail end of tone arm 4, that is, the end which is remote from head shell 6, as is conventional, for balance.

A horizontal drive motor 11 is mechanically coupled to shaft 3 and is adapted to drive the shaft such that it rotates about a vertical axis and, thus, correspondingly drives tone arm 4 in the horizontal direction. Horizontal drive motor 11 includes source of magnetic flux, such as an arcuate permanent magnet 12 which is curved about shaft 3 and secured to a yoke assembly, and a drive coil 13 which is adapted to be driven or rotated, together with shaft 3 bi-directionally about the vertical axis of the latter in parallel with the upper surface of permanent magnet 12, as represented by arrows b and b' (FIG. 2). The yoke upon which permanent magnet 12 is supported is comprised of, for example, a yoke member 15 upon which the permanent magnet is mounted, and a yoke member 18, members 15 and 18 being provided as congruent arcuate segments which are spaced apart from each other. Yoke member 15 terminates in upstanding members at its opposite ends to which yoke member 18 is joined. Hence, permanent magnet 12 together with yoke members 15 and 18 comprise a magnetic circuit in which the magnetic flux is generated in the upward direction from yoke member 15 toward yoke member 18, as viewed in FIG. 1. The yoke assembly, comprised of yoke members 15 and 18, is secured to bearing block 2 by an arm 14, as shown more clearly in FIG. 2. Hence, since the bearing block is fixed against rotation, it is appreciated that the yoke assembly likewise remains stationary relative to the rotation of shaft 3.

Drive coil 13 is wound about a bobbin 17 whose central opening receives yoke member 18. Bobbin 17 is coupled to shaft 3 by an arm 16 such that drive coil 13 is movable along yoke member 18, yet is properly spaced therefrom so as to avoid contact with this yoke member. Drive coil 13 is adapted to be supplied with an energizing current which may flow through coil 13 in either of two directions, represented by arrows a and a' in FIG. 2, and which intersects with the magnetic flux at right angles. Thus, a drive force in the direction shown by arrow b or b' in FIG. 2 is imparted to coil 13 to drive tone arm 4 in the lead-in direction or the lead-out direction depending upon the direction of current through coil 13. That is, when energizing current is supplied in the direction of arrow a, the interaction between this current and the magnetic flux in which drive coil 13 is disposed results in a force in the direction of arrow b. Conversely, when an energizing current is supplied to drive coil 13 in the direction indicated by arrow a', a force is produced in the direction of arrow b'. Coil 13, together with bobbin 17 about which the coil is wound, is displaced along yoke member 18 by reason of these forces b and b'. As coil 13 is displaced, arm 16 rotates so as to correspondingly rotate shaft 3 to which this arm is secured. Thus, it is seen that tone arm 4 bi-directionally rotates in the horizontal direction as a result of the energizing currents which are supplied to drive coil 13 of horizontal drive motor 11. Further, the drive force imparted to coil 13 increases with the intensity of current flowing through coil 13, although such drive force is constant for any given intensity of current.

A vertical drive motor 20 is coupled to the rearward, or tail end, of tone arm 4 and, in principle, is similar in operation to that of horizontal drive motor 11. As shown in FIG. 3, the vertical drive motor includes a magnetic circuit comprised of a yoke assembly 22 and a pair of oppositely poled permanent magnets 23. Yoke assembly 22 is formed of side walls which, as shown in FIG. 1, are arcuately shaped, the inner surfaces of these side walls, that is, the surfaces which are in face-to-face relationship with each other, having permanent magnets 23 secured thereto, as by a suitable adhesive. Yoke assembly 22, which is constructed of a magnetically permeable material, also includes a centrally disposed member 27. When viewed in FIG. 3, the magnetic flux generated by permanent magnets 23 extends from one to the other magnet transversely of center member 27. Yoke assembly 22 is coupled to shaft 3 by a support arm 21 and, therefore, is rotatable in the horizontal direction with the shaft and, thus, with tone arm 4. Arm 21 is fixed against vertical movement and, consequently, yoke assembly 22 likewise remains fixed against such vertical movement.

Vertical drive motor 20 additional includes a bobbin 25 whose opening receives central member 27, as shown in FIG. 3. A drive coil 26 is wound on bobbin 25 and thus, is disposed in the magnetic flux generated between permanent magnets 23. A mounting frame 24 is secured to bobbin 25, and this mounting frame additionally is coupled to tone arm 4. In addition, weight 9 is fixed to the tail end of tone arm 4 by mounting frame 24. The direction of energizing current flowing through drive coil 26 is normal to the direction of the magnetic flux. Hence, drive A vertically directed drive force in vertical direction shown by arrow c or c' in FIG. 1 is imparted to tone arm 4 due to the interaction between this energizing current and the magnetic flux so as to drive tone arm 4 in the vertical direction. The direction of this force (i.e., up and down) is dependent upon the direction in which the energizing current flows through drive coil 26. Thus, if coil 26 is energized so as to rotate in the direction of arrow c, tone arm 4 is pivoted about pivot axis 5 so as to lower stylus 8 onto the surface of record disc 31. Conversely, if coil 26 is energized so as to pivot in the direction of arrow c' about pivot axis 5, tone arm 4 is rotated so as to lift stylus 8 from the surface of the record disc.

The above described tone arm 4 is thus moved in the horizontal direction with respect to a record disc 31 on a turntable 30 by horizontal drive motor 11, and is also moved in the vertical direction with respect to the record disc by vertical drive motor 20. It will be understood that the respective motors are supplied with electric power from respective motor control drive circuits in order to control the horizontal and vertical movement of tone arm 4.

In the apparatus according to this invention, vertical drive motor 20 for tone arm 4 is utilized to apply a desired stylus pressure to record disc 31 and the value of this stylus pressure is displayed in a display circuit. That is, it is seen that if the energizing current supplied to drive coil 26 is varied so as to increase the force exerted on the drive coil in the direction of arrow c, the pressure exerted by stylus 8 on record disc 31 is increased. Conversely, if this force on coil 26 is reduced, or if a counter force is produced in the direction of arrow c', the pressure exerted on record disc 31 by stylus 8 is correspondingly reduced. This feature is turned to account by the present invention, wherein an electronic circuit is provided to adjust the stylus pressure exerted on the record disc by stylus 8. One embodiment of such an electronic circuit is illustrated in the partial block, partial schematic diagram of FIG. 4. This circuit is comprised of a drive circuit 40 connected to drive coil 26 of vertical drive motor 20 for adjusting the stylus pressure. Although drive circuit 40 may be included in the overall motor drive circuit which is provided for coil 26, it is illustrated herein as a separate circuit in order to facilitate a ready understanding of the present invention. Drive circuit 40 is comprised of an operational amplifier 40a having inverting and non-inverting inputs. The operational amplifier 40a is connected at its non-inverting input to a reference potential, such as ground, and is connected at its inverting input through a resistor 41 to an adjustable element, such as a variable resistor 42, which supplies a control voltage thereto for setting a desired stylus pressure. Variable resistor 42 is connected across a source of operating voltage +B so as to produce the desired control voltage. The inverting input of amplifier 40a is also connected through a resistor 43 to the output of amplifier 40a which, together with resistor 41, establishes the gain of operational amplifier 40a. However, although operational amplifier 40a is connected as a so-called inverting amplifier, it will be appreciated by those of ordinary skill in the art that, if desired, the operational amplifier may be connected as a non-inverting amplifier. Further, the output of operational amplifier 40a is connected to drive coil 26 of vertical drive motor 20 to supply an energizing current thereto as a function of the setting of variable resistor 42. A junction point between the slidable contact of variable resistor 42 and input resistor 41 of drive circuit 40 is connected via the slidable contact of a variable resistor 44. To a display circuit 50 for displaying a detected digital signal corresponding to the stylus pressure. Variable resistor 44 serves as a display calibration resistor to match the magnitude of the control voltage derived from variable resistor 42 with the amplitude parameters of display circuit 50. The display circuit 50 is comprised of, for example, an analog-to-digital (A/D) converter 51, a decoder 52, a driving circuit 53 and a digital indicator 54. A/D converter 51 may be of conventional construction and is adapted to produce a digital representation of the control voltage supplied thereto from variable resistor 42.

In operation, the control voltage which is established by the setting of variable resistor 42 is supplied to the inverting input of operational amplifier 40a via resistor 41. If the resistance value of the resistor 41 is given as $R_i$ and a current flowing through this resistor 41 is given as i, a control voltage e at the slidable contact of variable resistor 42 can be expressed as follows:

$$e = R_i \times i$$

From the above equation, it should be noticed that the desired stylus pressure is proportional to the current i and control voltage e. Accordingly, as the value of variable resistor 42 is changed, an energizing current having a value corresponding to the input current i of drive circuit 40 is supplied to drive coil 26 so as to achieve a desired stylus pressure setting. Thus, if the setting of the variable resistor is such as to produce a control voltage having a relatively higher level, the stylus pressure exerted on record disc 31 (FIG. 1) likewise is relatively higher. Conversely, if the setting of variable resistor 42 results in a control voltage of a relatively lower level, the stylus pressure likewise is at a correspondingly lower level. Thus, the pressure exerted on record disc 31 by stylus 8 is determined by the control voltage which is established by the setting of variable resistor 42.

Further, a current proportional to the input current of drive circuit 40 is supplied to variable resistor 44 so as to generate the control voltage corresponding to the stylus pressure. This control voltage, as established by the setting of variable resistor 42, is thus also supplied through resistor 44 to A/D converter 51 where it is converted to a corresponding digital signal or representation, which is then decoded by decoder 52. This decoded representation is then supplied through driving circuit 53 to digital indicator 54. Consequently, the level of the control voltage, which is seen to represent a level of the stylus pressure, is displayed. Preferably, the digital display is calibrated such that the control voltage derived from variable resistor 42 is displayed as a corresponding stylus pressure in terms of grams. If, while the record playing device is in use, that is, while the record playing device is reproducing the information recorded on record disc 31, the user wishes to change the stylus pressure, he need merely adjust variable resistor 42 so as to change the control voltage derived therefrom. This change in the control voltage effects a corresponding change in the stylus pressure. Also, as this control voltage is changed, the indication of stylus pressure, as displayed by digital display 54, likewise is changed so as to reflect the new pressure which has been selected by the operator. In the stylus-pressure adjusting and displaying circuit described above, although the actual stylus pressure applied by the driving force of the motor is an analog value, the display circuit displays the stylus pressure in digital form. Assuming that the stylus pressure is displayed for every 0.1 gram of change, a maximum display error of ±0.05 gram may result with respect to the actual stylus pressure. This means that, although the control voltage which is derived from variable resistor 42 may change by less than 0.1 gram, this change in the control voltage will not be reflected in a change in the numerical indication displayed by digital display 54 and, the displayed stylus pressure may therefore differ from the actual stylus pressure by this error. Nevertheless, such a small error in the displayed stylus pressure will have little, if any, effect on the overall performance of the illustrated apparatus.

The reason for the aforementioned display error is due to the fact that variable resistor 42 may be varied continuously, whereas the digital representation produced by A/D converter 51 varies in a step-wise manner. Accordingly, it is possible to reduce this display error by using a stepwise variable resistor in place of the continuously variable resistor 42. Hence, each change in the setting of such a step-wise variable resistor will result in a discrete, or step-wise, change in the control voltage to which A/D converter 51 will respond. With this arrangement, however, the resistance value for each step of the variable resistor must be highly accurate. Furthermore, since mechanical apparatus is relied upon for changing the setting of the stepwise variable resistor, there must be no loss due to this mechanical apparatus.

Figure 5:
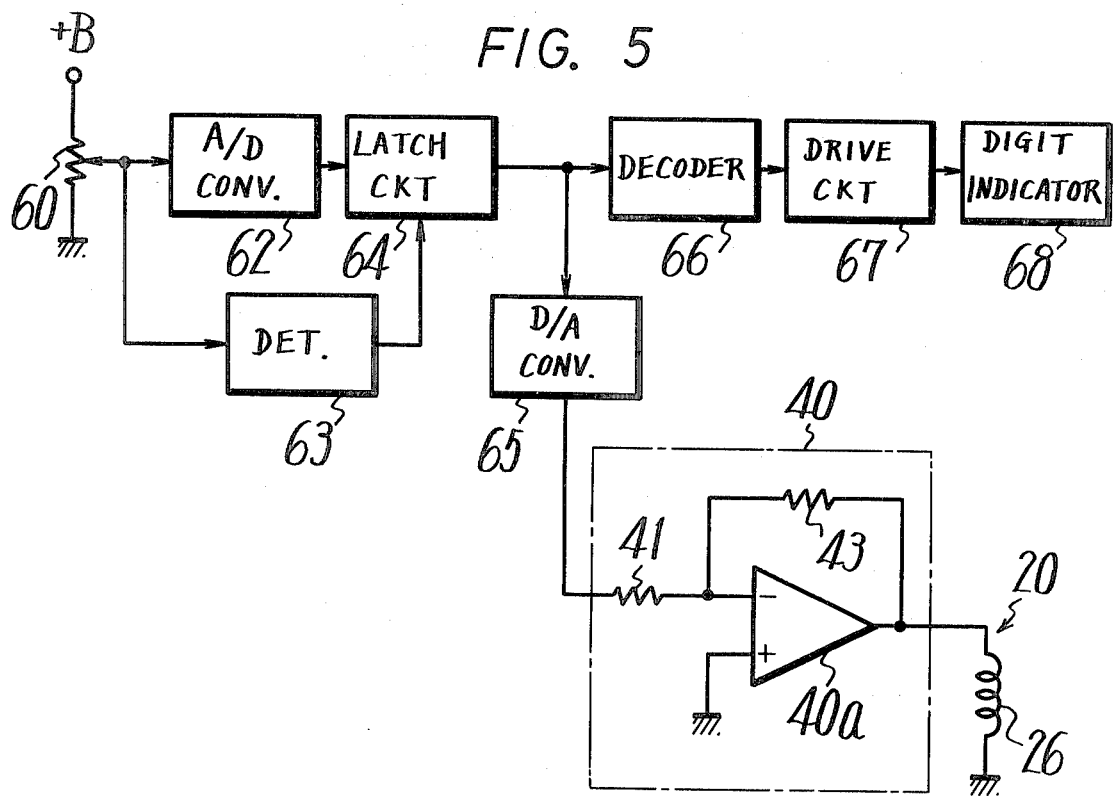
FIG. 5 is a partial block, partial schematic diagram of another embodiment of this invention.

The aforementioned display error is overcome by the embodiment illustrated in FIG. 5. In this embodiment, the same drive circuit 40 is used to supply an energizing current to drive coil 26 so as to establish the stylus pressure exerted on record disc 31 by stylus 8. Also, a control voltage with its level being continuously adjusted is derived from a variable resistor 60 similar to aforedescribed variable resistor 42, for adjusting the stylus pressure. This control voltage is supplied to an A/D converter 62 and a setting change detector 63.

A/D converter 62 may be similar to aforedescribed A/D converter 51 and functions to convert the analog control voltage from variable resistor 60 into a digital signal or representation, such as a binary coded signal. As the setting of the variable resistor is changed, the level of the control voltage correspondingly changes so as to effect a change in the digital representation produced by the A/D converter digital. This representation is supplied to a latch circuit 64 to be stored therein. Setting change detector 63 is adapted to detect the absence of any change in the level of the control voltage from variable resistor 60. This absence of any change causes detector 63 to trigger latching circuit 64 to latch, or store, the digital representation produced by A/D converter 62. Thus, it is seen that the purpose of the combination of setting change detector 63 and latching circuit 64 is to prevent the latching circuit from storing a digital representation of a changing control voltage. It is only when the desired control voltage is reached, that is, once the adjustment operation has been completed, that latching circuit 64 stores the digital representation thereof. When another adjustment operation is initiated, latching circuit 64 is inhibited from storing the changing digital representation which is produced by A/D converter 62 in response to the changing control voltage.

The stored digital representation from latch circuit 64 is supplied to a D-A converter 65 and a decoder 66, respectively. The decoder 66 converts the above digital representation control signal into, for example, a 7-segment decimal code. And the output of decoder 66 is fed to a driving circuit 67 to thereby drive a digital indicator 68 which may be, for example a, 7-segment display, resulting in a visual numerical indication. D/A converter 65 converts the stored digital control signal into an analog control signal having a level corresponding to the digital control signal. This analog representation is supplied to drive circuit 40 for adjusting the stylus pressure. That is, in drive circuit 40, amplifier 40a supplies a drive current to coil 26, which serves to apply a drive force for adjusting the stylus pressure to tone arm 4, in response to the signal level of the analog control signal. In this embodiment, the resistance values of resistors 41 and 43 for setting the gain of amplifier 40a are adjusted in advance so that the actual stylus pressure accurately corresponds to the displayed value from digital indicator 68. It is appreciated that even though the control voltage produced by variable resistor 60 may be changed by a small amount, if this change does not result in a change in the digital representation produced by A/D converter 62, there will no change in the analog level produced by D/A converter 65. For example, if the setting of variable resistor 60 produces a control voltage corresponding to the stylus pressure and A/D converter 62 produces a digital representation of this stylus pressure, this digital representation is stored in latching circuit 64. D/A converter 65 re-converts this digital representation of stylus pressure to a corresponding analog level which is supplied to drive circuit 40, whereupon the energizing current applied to drive coil 26 by the drive circuit results in a corresponding analog pressure. Let it be assumed that the setting of variable resistor 60 is changed so as to produce a control voltage corresponding to a stylus pressure which varies by a small amount which is below the resolution of the A/D converter. Hence, even though the control voltage level corresponds to this new stylus pressure, A/D converter 62 will continue to produce a digital representation of the previous stylus pressure. This previous digital representation of stylus pressure is stored in latching circuit 64 and is reconverted by D/A converter 65 to an analog level corresponding to the previous stylus pressure. Therefore, even though the setting of variable resistor 60 may be changed, if this change is below the resolution of A/D converter 62, the fact that there will be no corresponding change in the digital representation of the control voltage means that the displayed stylus pressure, which is derived from the digital representation produced by A/D converter 62, will be equal to the actual stylus pressure which is exerted on the record disc and which is determined by the energizing current produced by drive circuit 40 which, in turn, is a function of the digital representation produced by A/D converter 62.

Figure 6:
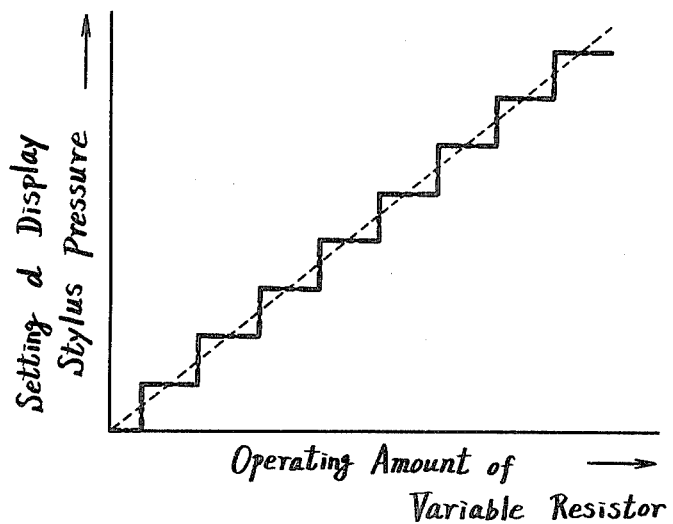
FIG. 6 is a graphical representation which is useful in understanding the advantages attained by the embodiment shown in FIG. 5.

In the described above embodiment of the stylus-pressure adjusting and displaying circuit, the control voltage from variable resistor 60 is fed to A/D converter 62 where it is converted into the digital representation or control signal, used to perform both the stylus-pressure adjusting operation and display the stylus-pressure setting value. A graphical representation of the relationship between the displayed/actual stylus pressure and the setting of variable resistor 60 is depicted in FIG. 6. In FIG. 6 the ordinate represents both actual stylus and displayed stylus pressure, while the abscissa represents the setting of variable resistor 60. By reason of D/A converter 65, it is recognized that the actual stylus pressure, that is, the stylus pressure determined by the energization current supplied to coil 26 by drive circuit 40, remains constant over a small, discrete range of resistor settings. That is, although the effective resistance value of variable resistor 60 may change continuously, the actual stylus pressure exerted on the record disc is changed in discrete, step-wise manner. The small range over which a change in the resistor setting does not result in a corresponding change in the actual stylus pressure represents the resolution, or responsiveness, of A/D converter 62. Since, as is apparent from FIG. 6, the actual stylus pressure is dependent upon a change in the digital representation produced by A/D converter 62, and since the displayed stylus pressure is dependent upon this same change, digital display 68 thus displays the correct actual stylus pressure which is exerted by stylus 8 on record disc 31. The display error associated with the embodiment shown in FIG. 4 thus is avoided by the embodiment of FIG. 5. This display error is represented by the broken line in FIG. 6 which represents the relationship between actual stylus pressure and the setting, or effective resistance, of the variable resistor (i.e., variable resistor 42). This relationship, as represented by the broken line, is superimposed onto the relationship between the displayed stylus pressure and the resistor setting, as represented by the step-wise graph. It is recognized that the broken line representing actual stylus pressure intersects the solid line representing displayed stylus pressure only at discrete points. For resistor settings that differ from such discrete points, the displayed stylus pressure either is more or less than the actual stylus pressure. That is, to the left of the point at which the step-wise graph intersects the broken line, the displayed stylus pressure is less than the actual stylus pressure; and to the right of such point, the displayed stylus pressure is greater than the actual stylus pressure. If each step of the solid step-wise graph corresponds to 0.1 gram, the maximum display error either is +0.05 gram (to the right of the intersection of the rising solid line and the broken line) or −0.05 gram (to the left of the intersection of the rising solid line and the broken line). In the FIG. 4 embodiment, the graph representing actual stylus pressure differs from the graph representing displayed stylus pressure. In the FIG. 5 embodiment, the graph representing actual stylus pressure is coincident with the graph representing displayed stylus pressure. Thus, in the FIG. 5 embodiment, the display error is avoided.

As apparent from the above description of the embodiments of this invention, stylus pressure can be adjusted, as desired, even during a reproducing operation of the record playing device, by adjusting variable resistor 42 or 60. At the same time, the stylus pressure is concurrently displayed in a digital manner, such as on the panel front surface. Accordingly, the stylus pressure at that time can be easily confirmed, Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

I claim as my invention:

1. A record player comprising:
a tone arm having a stylus;
electro-magnetic means for moving said tone arm in the vertical direction with respect to a record surface;
a drive circuit connected to said electro-magnetic means;
adjusting means connected to said drive circuit for varying a current flow through said electro-magnetic means so as to vary the stylus pressure on said record surface, said adjusting means including a variable resistor, an analog-to-digital converter for converting a voltage derived from said variable resistor into a digital value, a latch circuit connected to said analog-to-digital converter, a detector circuit connected between said latch circuit and said variable resistor for detecting the absence of any change in the level of the voltage derived from said variable resistor, and a digital-to-analog converter connected between an output of said latch circuit and said electro-magnetic means; and
display means coupled to said adjusting means for displaying an indication of said stylus pressure, said display means including a digital indicator connected to the output of said latch circuit.

2. Apparatus for adjusting and displaying the stylus pressure exerted on a record disc by a stylus carried by a tone arm in a record playing device of the type having a vertical drive motor for bi-directionally driving said tone arm in the vertical direction, said apparatus comprising adjusting means for producing a control signal whose level is determinative of said stylus pressure, energizing means responsive to said control signal for energizing said vertical drive motor in accordance with the level of said control signal, thereby establishing said stylus pressure; and display means responsive to said control signal for providing a visual display of said stylus pressure as determined by the level of said control signal.

3. The apparatus of claim 2; wherein said adjusting means comprises variable resistance means and a source of operating voltage coupled to said variable resistance means, the level of said control signal being established by the effective resistance of said variable resistance means.

4. The apparatus of claim 3; wherein said display means comprises digital indicating means for providing a digital indication corresponding to the level of said control signal.

5. The apparatus of claim 4; wherein said digital indicating means comprises analog-to-digital converting means for producing a digital representation of said control signal; and digital display means for producing a digital display indication of said digital representation.

6. The apparatus of claim 5; wherein said digital display means comprises numerical display means; decoding means for decoding said digital representation into a digital signal compatible with said numerical display means; and display driving means for driving said numerical display means with said decoded digital signal.

7. The apparatus of claim 4; wherein said energizing means comprises analog-to-digital converting means for producing a digital representation of said control signal; latching means for storing said digital representation; digital-to-analog converting means coupled to said latching means for converting said stored digital representation to a corresponding analog signal; and means for supplying an energizing current to said vertical drive motor as a function of said analog signal.

8. The apparatus of claim 7; wherein said digital indicating means comprises numerical display means; decoding means coupled to said latching means for decoding said stored digital representation into a digital signal compatible with said numerical display means; and display driving means for driving said numerical display means with said decoded digital signal.

9. The apparatus of claim 8; further comprising detecting means for detecting when the effective resistance of said variable resistance means is changing and for operating said latching means to store a new digital representation after said effective resistance has been changed.

* * * * *